SWEEP-MEMORY VOLTAGE GENERATOR

Filed Dec. 10, 1959

INVENTOR.
WILLIAM H. WOODWORTH 2,979,614

SWEEP-MEMORY VOLTAGE GENERATOR

William H. Woodworth, China Lake, Calif., assignor to the United States of America as represented by the Secretary of the Navy Filed Dec. 10, 1959, Ser. No. 858,829

4 Claims. (Cl. 250—20)

(Granted under Title 35, U.S. Code (1952), sec. 266)

The invention herein described may be manufactured and used by or for the Government of the United States of America for governmental purposes without the payment of any royalties thereon or therefor.

The present invention relates to a linear time-variant or "sweep" generator which may be stopped from sweeping and remember the value where stopped. When stopped, it operates as an integrating amplifier wherein drift is reduced to a minimum and a high order of memory is realized.

This device comprises a magnetic amplifier and RC circuitry which may be used as a sweep generator and/or as a memory device used in conjunction with a radar system wherein the oscillator fresuency thereof is varied as a function of the memory output voltage in order to provide a constant beat frequency. Older sweep generators and memory devices have used vacuum tube circuitry which have been successful; however, these older devices have been very complicated, expensive, of considerable weight and of relatively high power consumption. The present invention overcomes these difficulties by utilizing a magnetic amplifier and RC circuitry which provides a light, compact, inexpensive and highly reliable unit.

An object of the invention is to provide an inexpensive, light weight, compact and highly reliable linear time-variant voltage sweep generator.

Another object is to provide a linear time-variant voltage sweep generator which can be stopped from sweeping and remember the value where stopped.

A further object is to provide a voltage memory device which operates as an integrating amplifier wherein drift is reduced to a minimum and a high order of memory is realized.

A still further object is to provide a memory device in conjunction with a radar system wherein the oscillator frequency thereof is varied as a function of the memory output voltage to provide a constant beat frequency.

Other objects and many of the attendant advantages of this invention will become readily appreciated as the same becomes better understood by reference to the following detailed description when considered in connection with the accompanying drawings wherein.

Figure 1:
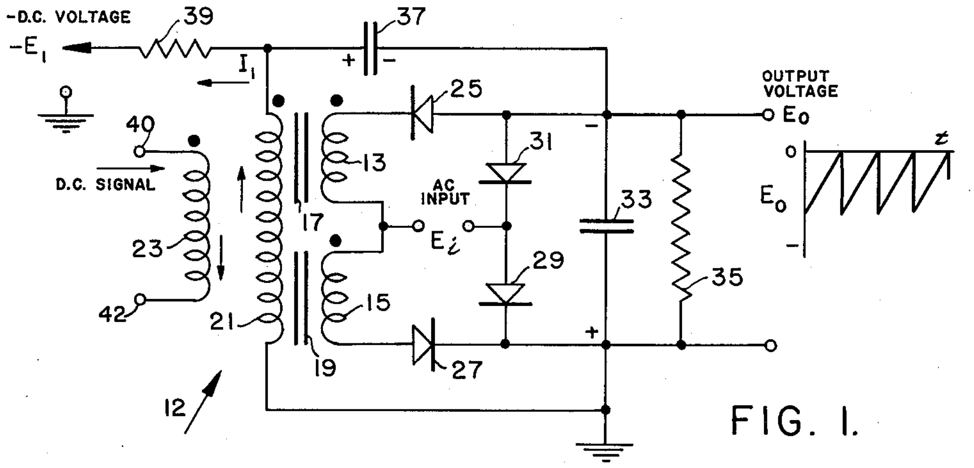
Fig. 1 illustrates the circuitry of the present invention which functions as a sweep generator and/or a memory device.

Referring now to Fig. 1 of the drawings, there is shown a sweep generator and memory device 11 including a magnetic amplifier 12 consisting of power coils 13 and 15 which are wound on separate tape wound cores 17 and 19, respectively, wherein control coils 21 and 23 are concentrically disposed and each is wound around and encloses both of coils 13 and 15. The magnetic amplifier further includes a bridge network consisting of coil 13 and diode 25 in one leg, coil 15 and diode 27 in another leg and diodes 29 and 31 in each of the other two legs. An A.-C. input $E_1$ is connected across the bridge network between coils 13 and 15 and diodes 29 and 31, respectively. A magnetic amplifier of this type is conventional and the operation thereof is described in "Magnetic Amplifiers," by Storm (published by John Wiley and Sons, 1955), pages 244–255. The D.-C. output of the magnetic amplifier is applied across output filter capacitor 33 and resistor 35 which are connected in parallel. The output voltage $E_o$ is taken across resistor 35, the saw-tooth wave form being shown adjacent thereto. A feedback including capacitor 37 is connected between one side of capacitor 33 and one end of coil 21 and the other side of coil 21 is connected to the other side of capacitor 33 and to ground. A negative D.-C. voltage $E_1$ is series connected through resistor 39 to the junction between coil 21 and capacitor 37.

Figure 3:
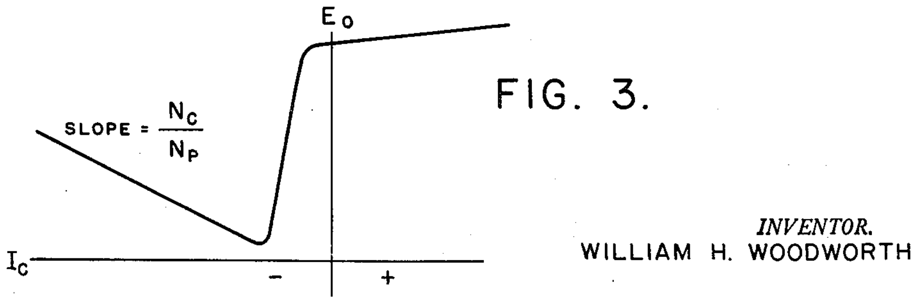
Fig. 3 is a graph showing the characteristics of a magnetic ampilfier, the abscissas denoting ampere-turns and the ordinate denoting output voltage.

The operation of the saw-tooth generator is as follows. Assuming the amplifier is operating initially at saturated core condition, the output voltage $E_o$ thereof (always negative) is at maximum value, capacitor 37 is charged as indicated and current $I_1$ is flowing through resistor 39 in the direction shown. The gain of a magnetic amplifier of this type is extremely high and if there is an extremely small change in current flow in coil 21 there is a very large change of output voltage $E_o$ and the voltage across capacitor 37 must therefore equal $E_o$. If the amplifier did not have an extremely high gain, then if $E_o$ varied from the voltage across capacitor 37 there would be finite current flow through coil 21, resulting in a drift or decrease of the voltage across capacitor 37 as well as $E_o$ because of the losses in coil 21. Therefore, by using a capacitor feedback in conjunction with an extremely high gain magnetic amplifier the memory or holding of a predetermined voltage is excellent thereby providing minimum drift, and linearity of the sweep is realized. If current flow $I_1$ is drawn in the direction shown, due to the negative value of $E_1$ with relation to the positive charge on capacitor 37, capacitor 37 will discharge through resistor 39 and there will be no current flow through coil 21 since the amplifier has high gain. The current flow through capacitor 37 is therefore equal to the current flow through resistor 39 and this current flow is constant with respect to time. Therefore, the voltage across capacitor 37 as well as $E_o$ will decrease linearly with respect to time. When $E_o$ reaches its minimum value then current $I_1$ will flow in coil 21, in the direction shown, which causes an increase in $E_o$. This increase of $E_o$ is very rapid snap action which results from the regenerative action due to the magnetic amplifier control characteristic shown in Fig. 3. Regeneration occurs when $Nc=Np$ where all the amplifier output current flows through $Nc$. If the amplifier is shunted by resistor R then $$Nc=Np\left(\frac{R}{R+Rc}\right)$$

where $Nc$ is the number of turns of coil 21, $Np$ is the combined number of turns of coils 13 and 15, R is the resistance of resistor 35 and $Rc$ is the resistance of coil 21. The frequency of oscillation is $$f=\frac{E_1}{R_1C_1E_o}$$

where $E_1$ is the voltage applied to capacitor 37, $R_1$ is the resistance of resistor 39, $C_1$ is the capacitance of capacitor 37 and $E_o$ is the maximum available output voltage. The snap action voltage increase of $E_o$ continues until it reaches its maximum negative value which is primarily determined by the magnitude of $E_1$. The charge on capacitor 37 follows the increase of $E_0$ and upon reaching maximum value the current flow in coil 21 ceases. The operation then repeats resulting in saw-tooth oscillations. The natural frequency of the device increases as a function of the increase of the negative polarity of $E_1$ since capacitor 37 discharges more rapidly, and the amplitude of $E_0$ increases with increasing amplitude of $E_1$.

The system is prevented from oscillating by applying a D.-C. signal to terminals 40, 42 of coil 23 and, assuming coils 21 and 23 are wound in the same direction with the current flow in coil 23 in the direction shown. The value of this current flow determines the operating point of voltage $E_0$ on the curve shown in Fig. 3 which voltage is maintained constant thereby providing a highly effective memory action as previously explained.

Figure 2:
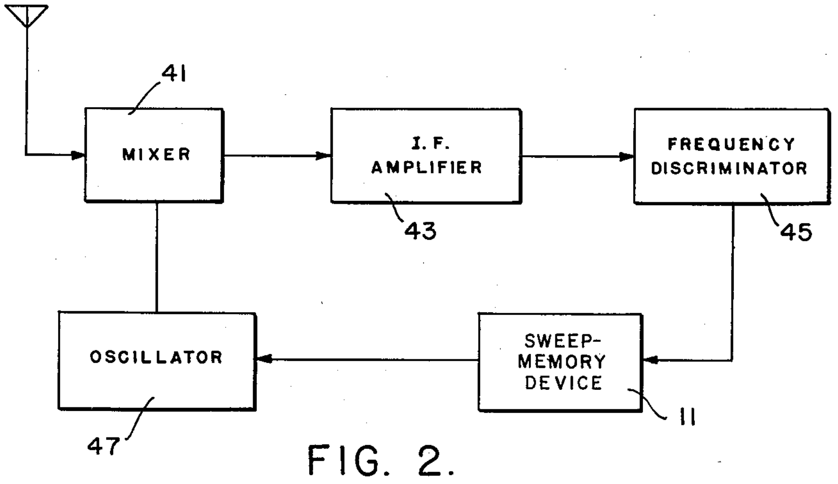
Fig. 2 illustrates the present invention as used in a radar system wherein the device shown in Fig. 1 functions both as a sweep generator and as a memory device.

Referring now to Fig. 2 of the drawings, there is shown a radar system having a mixer stage 41 receiving the incoming and oscillator 47 signals, the output of which is applied to I.F. amplifier 43, the output thereof being applied to frequency discriminator 45. The D.-C. output of frequency discriminator 45 is applied to coil 23 of the memory device 11 shown in Fig. 1. The frequency of oscillator 47, being of the reflex klystron type, for example, is determined by the value of $E_0$. The memory device is used in this circuit to establish an oscillator frequency which maintains the beat frequency (sum or difference of the oscillator frequency and the incoming signal frequency) at a constant value. Conventional values of this beat frequency $f_0$ are between 30 and 70 megacycles. When the input frequency to frequency discriminator 45 is other than $f_0$ then the output thereof will have either positive or negative polarity depending upon whether this input frequency is more or less than $f_0$.

The operation of the device is as follows. Assume the input frequency to the discriminator is less than $f_0$ and the D.-C. output of the discriminator is positive. This positive D.-C. output is applied to coil 23 of memory device 11 which causes $E_0$ to become greater. This greater $E_0$ signal is applied to the repeller of oscillator 47 which causes the output frequency thereof to increase thereby increasing the input frequency to the discriminator towards $f_0$ and the discriminator output towards zero. The function is that of a closed loop servo system wherein the beat frequency is always maintained at a constant value independent of changes of the incoming signal.

The sweep frequency range of oscillator 47 is determined by the magnitude of the sweep of sweep-memory device 11. If no signal is being received by the antenna or the frequency of the antenna signal is outside of normal limits to have mixer 41 deliver a beat frequency $f_0$ acceptable by I.F. amplifier 43 then sweep-memory device 11 will freely sweep. This is because the output of the I.F. amplifier is zero and no current is flowing through control winding 23 of the sweep-memory device. The output of the I.F. amplifier becomes finite only when the difference between the oscillator and mixer frequencies is within the band pass of the I.F. amplifier. Therefore, when the antenna receives a signal within the oscillator sweep frequency range the output of the I.F. amplifier becomes finite and the system will lock upon it as previously explained.

Obviously many modifications and variations of the present invention are possible in the light of the above teachings. It is therefore to be understood that within the scope of the appended claims the invention may be practiced otherwise than as specifically described.

What is claimed is:

1. A linear time-variant saw-tooth voltage generator comprising a magnetic amplifier having an input, output means including a diode bridge rectifier network and a control winding, a filter capacitor connected across said output means, a capacitor operatively interconnecting one side of said filter capacitor and one end of said control winding, the other end of said control winding operatively connected to the other side of said filter capacitor and to ground, negative potential means, a resistor interconnecting said negative potential means and said one end of said control winding and said capacitor whereby current linearily flows from said capacitor to said negative potential means until said capacitor is fully discharged at which time current then flows through said control winding to said negative potential means thereby providing a linear time-variant saw-tooth voltage across said output means.

2. The linear time-variant saw-tooth voltage generator in accordance with claim 1 in which said magnetic amplifier has another control winding, a potential source operatively connected with said another control winding whereby current flow therethrough prevents current flow from said capacitor and maintains the output voltage at a constant value with respect to time.

3. The combination of a radar system including an incoming signal, a mixer, an I.F. amplifier, a frequency discriminator, a sweep memory device and an oscillator, said incoming signal and the output signal of said oscillator operatively connected to said mixer, the output of said mixer having a beat frequency which is the sum or the difference of said incoming signal and said oscillator output signal, the output of said mixer being applied to the input of said I.F. amplifier, the output of said I.F. amplifier being applied to the input of said frequency discriminator, the output of said frequency discriminator being of given polarity when the beat signal is above a predetermined value and of opposite polarity when below said predetermined value, said sweep-memory device including a magnetic amplifier provided with power and first and second control windings, an output and an input operatively connected to said power winding, capacitive feedback means from said output to said first control winding, and a potential source operatively connected to said feedback means for drawing current therefrom, the output of said frequency discriminator connected to said second control winding to vary the output of said magnetic amplifier as a function of the output of said phase discriminator, and the output of said magnetic amplifier connected to said oscillator to vary the output frequency thereof to maintain said beat frequency at a constant value.

4. The device of claim 3 wherein the sweep-memory device operates in sweep-generator mode in the absence of I.F. amplifier output to said second control winding.

References Cited in the file of this patent

UNITED STATES PATENTS

| | | |
|---|---|---|
| 2,764,719 | Woodson | Sept. 25, 1956 |
| 2,777,055 | Goldberg | Jan. 8, 1957 |
| 2,827,570 | Lynn | Mar. 18, 1958 |
| 2,838,671 | Miller et al. | June 10, 1958 |
| 2,848,674 | Forman | Aug. 19, 1958 |
| 2,852,669 | Ashby | Sept. 16, 1958 |
| 2,869,680 | Bycer | Jan. 13, 1959 |

OTHER REFERENCES

"Using the Varicap," R. F. Turner, Electronics, May 1958, pages 57–9.

"The Frequency Lock A.F.C. Circuit," R. Leek, Institution of Electrical Engineers, No. 2411R, November 1957, pages 587–597.